March 23, 1948.   H. B. WILSON   2,438,470
RADIANT GAS TOASTER AND BROILER
Filed April 21, 1944   4 Sheets-Sheet 1

INVENTOR
HARRY B. WILSON
BY
ATTORNEY

March 23, 1948. H. B. WILSON 2,438,470
RADIANT GAS TOASTER AND BROILER
Filed April 21, 1944 4 Sheets-Sheet 2

INVENTOR
HARRY B. WILSON
BY
ATTORNEY

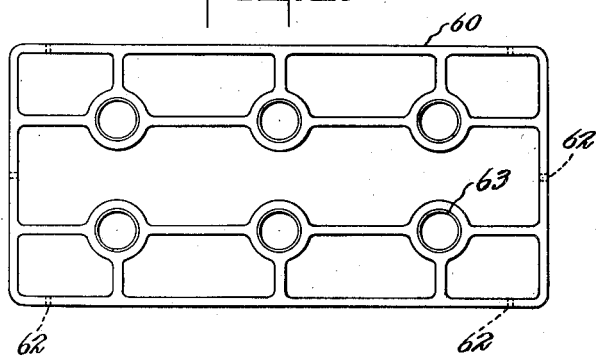
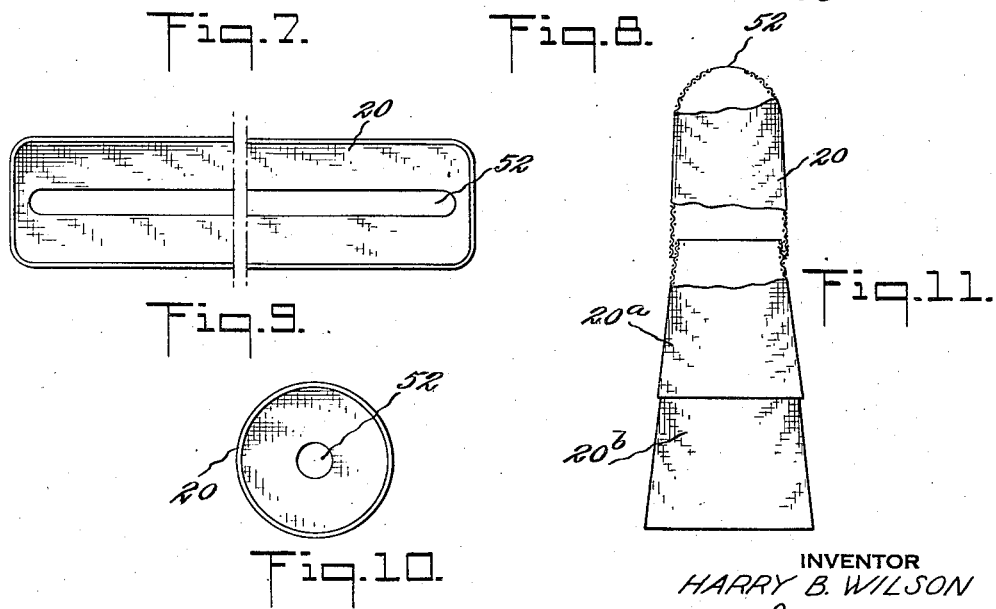

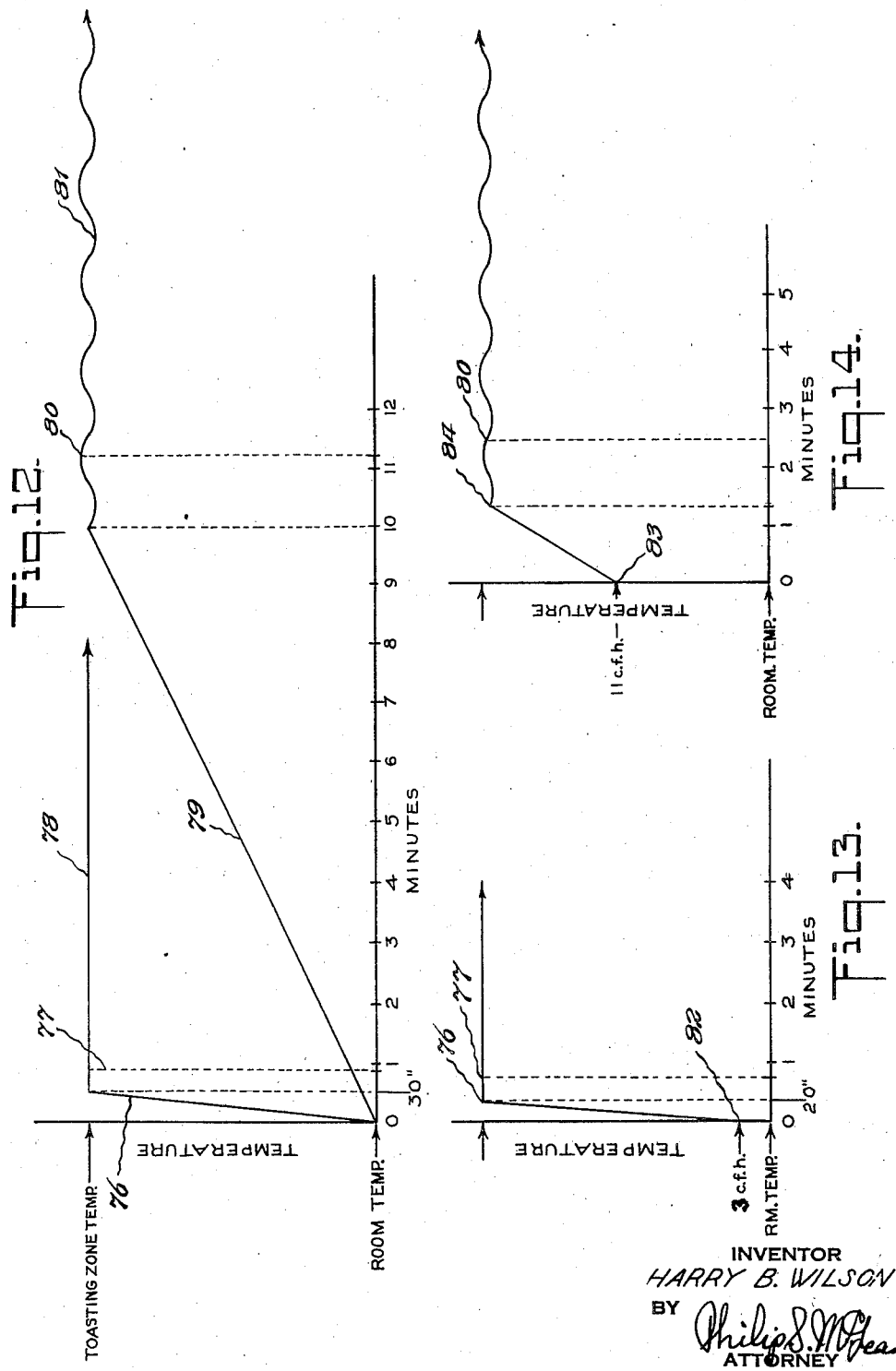

Patented Mar. 23, 1948

2,438,470

UNITED STATES PATENT OFFICE 2,438,470

RADIANT GAS TOASTER AND BROILER

Harry B. Wilson, Brooklyn, N. Y.

Application April 21, 1944, Serial No. 532,157

1 Claim. (Cl. 99—386)

The invention herein disclosed relates to cooking or heating apparatus in the nature of toasters, broilers and the like.

Special objects of the invention are to attain greater efficiency, economy and speed in cooking and heating operations than has heretofore been possible and to accomplish this with simple, practical and inexpensive means.

More specific objects of the invention are to provide a toaster, broiler or the like, in a form which will furnish practically instantaneous maximum heat and maintain that heat without the necessity of regulators or heat controls and without accumulation or storing up of heat to be dissipated later.

Other desirable objects and the novel features by which the purposes of the invention are attained will all appear in the course of the following specification.

The drawings accompanying and forming part of the specification illustrate several different embodiments of the invention, but the structure may be further modified and changed all within the true intent and broad scope of the invention as hereinafter defined and claimed.

Fig. 5 is a plan view of the grid forming the bottom of the broiler.

Fig. 6 is a broken part sectional view of a mantle support adapted for use in either the toaster or broiler.

Fig. 7 is a broken side elevation and

Fig. 8 a broken end view of a modified elongated form of a mantle.

Fig. 9 is a broken bottom view of the elongated type mantle.

Fig. 10 is a bottom view of the conical type of mantle such as shown in Fig. 6.

Fig. 11 is a broken sectional detail of a multiple section type of mantle.

Figs. 12, 13 and 14 are diagrams representing operational features.

Basic features of the invention are the utilization of the Welsbach mantle type of combustion and the employment of heat, rather than light radiating oxides, in conjunction with shields for reflecting and concentrating the radiant heat and free of insulation or other heat absorbing means.

Figure 1:
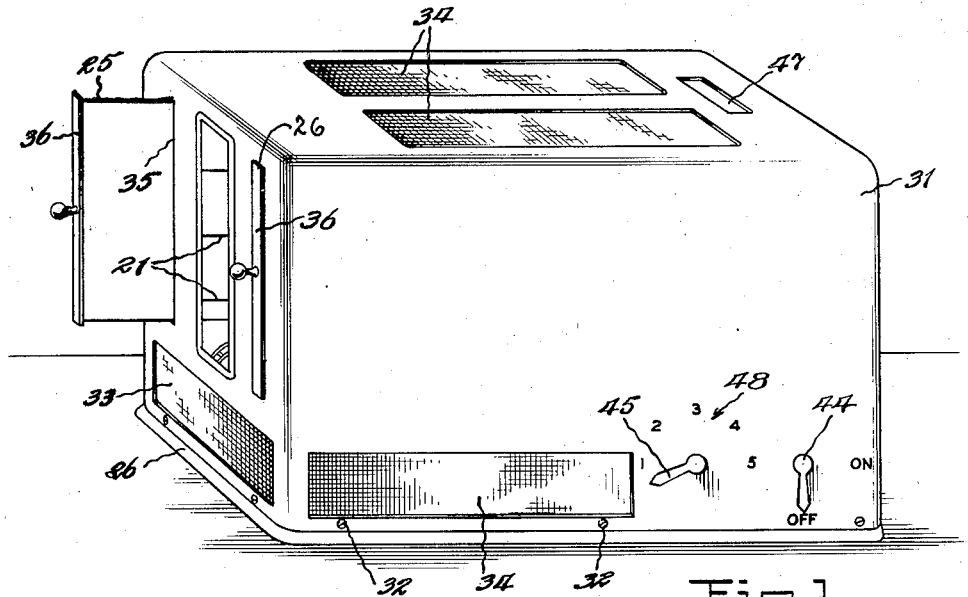
Fig. 1 is a perspective view of a toaster embodying features of the invention.
Figure 2:
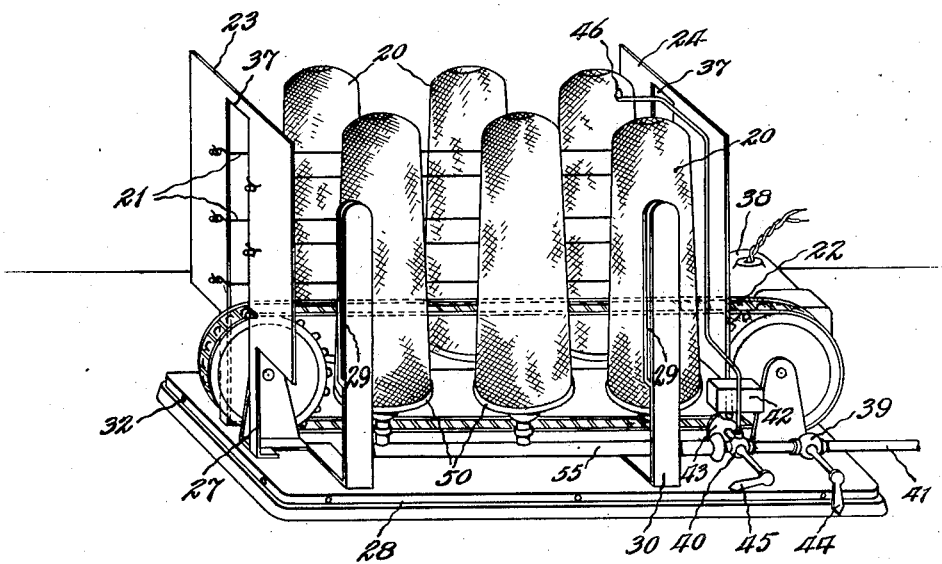
Fig. 2 is a similar view, with the cover or case removed to show the inner structure.

In Figs. 1 and 2, a toaster is disclosed embodying heat radiating gas mantles 20, arranged three in a row at opposite sides of a toasting passage or channel defined by guide wires 21, at the sides and a conveyor chain 22, at the bottom.

At the ends of the mantles are light sheet metal radiant heat reflectors 23 and 24, and at the sides of the mantles are similar light sheet metal radiant heat reflectors 25, 26, these forming a heat radiating and reflecting enclosure about and in back of the mantles for concentrating the radiant heat energy so far as possible on the channel through which the food is passed.

The end reflectors 23, 24, may be fixedly supported, as by suitable mounting brackets 27, on the base structure 28, and the side reflectors may be removably mounted as by sliding them into the guides 29, in the posts 30, mounted on the base.

Usually a more or less ornamental enclosure may be provided, such as the hollow casing shown at 31, Fig. 1, secured over the base as by screws at 32, and having air supply and vent grilles 33, 34, in lower and upper portions of the same. At the front this casing is shown as slotted at 35, in line with the guides 29, for removal and replacement of the side reflectors 25, 26, and the latter are indicated as having end flanges 36, serving as closures over said slots.

The guide wires 21, are shown as supported by the end shields 23, 24, at opposite sides of the vertical slots 37, therein, defining the passageway and the chain 22, constituting the bottom of the passageway is indicated as driven by an electric motor 38.

Control and regulation is effected in the illustration by an "on" and "off" valve 39, and a regulating valve 40, in the gas supply piping 41, and a switch 42, for the motor, operable by a cam 43, on the stem of the regulating valve. The shut-off and the control valve are shown in Fig. 1, as having operating handles 44, 45, at the outside of the casing.

The control valve 40, as indicated in Fig. 2, may have a pilot connection 46, extending therefrom to a position accessible for lighting through an opening 47, Fig. 1, in the top of the casing.

With this particular valve arrangement, the pilot may be lighted through the opening 47, when the main valve 39, is turned on by handle 44. If the control valve is in the lower or "off" position indicated in Fig. 1, no gas will flow to the mantles and hence there will then only be a pilot light burning. Control valve 40, may be so designed as to turn on the gas to the mantles starting at the No. 1, position on the scale 48, Fig. 1 and the cam be so shaped as to turn on the motor switch and hold it on, starting at the first position and throughout the balance of the scale. Hence control handle 45, may be utilized to turn the mantles "on" and "off" and to regulate the intensity of heat developed and to start the conveyor and to keep it running at any and all times the mantles are "on."

While possible that conventional light emitting Welsbach type mantles may be employed, it is considered preferable to use a heavier form of mantle, having an asbestos, ceramic or foraminous metallic base or diaphragm and a basic or metallic oxide of the heat emitting type, such as cerium, rather than the commonly used oxides of the light emissive type, such as thorium. These heavier base, cerium oxide mantles, in addition to having a higher heat-light ratio are self-sustaining, stronger, capable of withstanding knocks and vibration and hence capable of meeting the requirements of the present invention.

The shape and size of these mantles may vary. In particular, they may be larger and heavier than ordinary incandescent lighting mantles. In Fig. 2, they are indicated as longer or higher than lighting mantles, so as to cover the full height of the toasting passage. In shape they may be cylindrical or conical as in Figs. 2, 6 and 10 and be made all in one piece or in telescopic sections as at 20, 20a, 20b, Fig. 11.

Figs. 7, 8 and 9, show how these mantles may be elongated to enable a single flat-sided shape to take in the field covered by a row of separate mantles.

These heavier mantles are rugged and strong enough to stand alone and do not have to be suspended like the conventional light mantles. This is a particularly practical advantage, in that it simplifies the mounting of the mantles.

Fig. 6 illustrates a suitable type of support, involving a substantially flat seat or shoulder 49, surrounded by a confining flange 50. These may conform to the circular, elongated or other base shape of the mantle. After locating the mantle on this seat, within the confines of the flange, a wire pin or other fastening 51, may be extended through openings in opposite sides of the flange and through the material of the mantle to retain the latter against dislodgement. The surrounding flange 50, braces and prevents spreading of the base portion of the mantle. If desired, the lower edge portion of the mantle may be reinforced, as by doubling back the fabric about the edge of the mantle or by weaving in a reinforcing wire or the like. In the several forms, the mantle is indicated as having a circular or elongated opening or slot 52, in the top of the same.

The mantle support 49, is shown in Fig. 6, as having a neck portion 53, to fit down over the outlet nipple 54, of the burner base 55.

Figure 3:
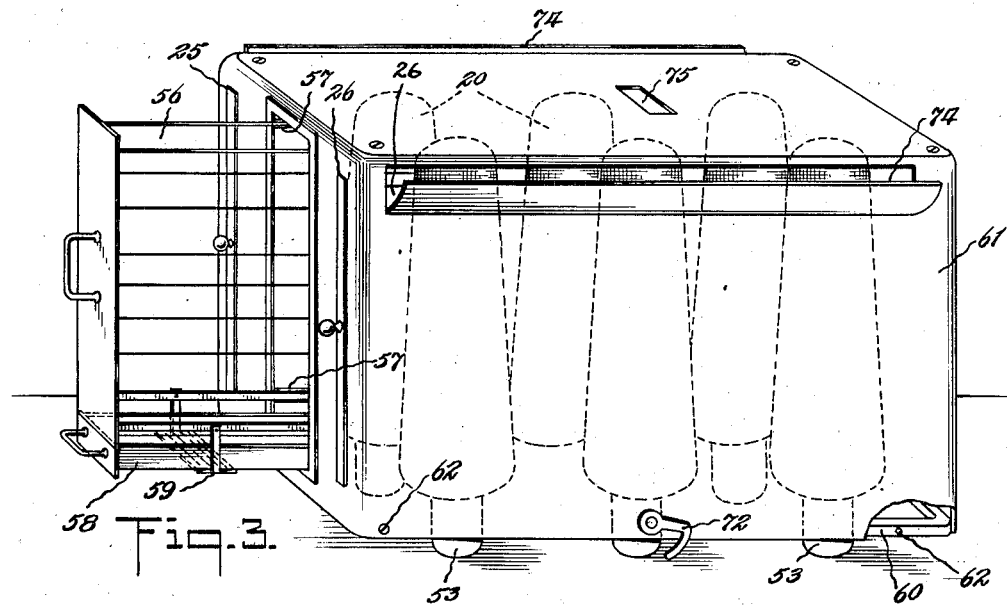
Fig. 3 is a perspective view of a grille or broiler constructed for mounting on a stove top.

A form of broiler for mounting on top of a stove is illustrated in Fig. 3, resembling the toaster to the extent of having mantles 20, disposed at opposite sides of a chamber or passageway and with heat reflecting shields back of the mantles. In this case however, the conveyor or support for the food is in the nature of an open work grille 56, sliding in guides 57, at opposite sides of the passageway.

The sliding rack or grille 56, is shown as carrying with it a drip pan or grease collector 58, indicated as removably suspended at the front in a hanger 59, it being understood that a similar support is provided at the inner end of the pan.

By such means, the grease collector remains a part of the sliding rack, but at any time, can be easily separated, for removing collected grease, cleaning and the like. If desired, the grease collecting pan may have a drainage outlet at the front or may contain a suitable absorbent pad or the like for collected grease.

The bottom of the broiler may be provided in the form of a frame or grid such as shown at 60, in Fig. 5, and over which the casing 61, of the broiler is secured at 62.

The bottom frame 60, is shown as having internally screw-threaded rings 63, to receive the screw-threaded portions 64, Fig. 6, on the flanges of the mantle supports 49. This arrangement enables the same mantle supports to be used in both the toaster and the broiler.

Figure 4:
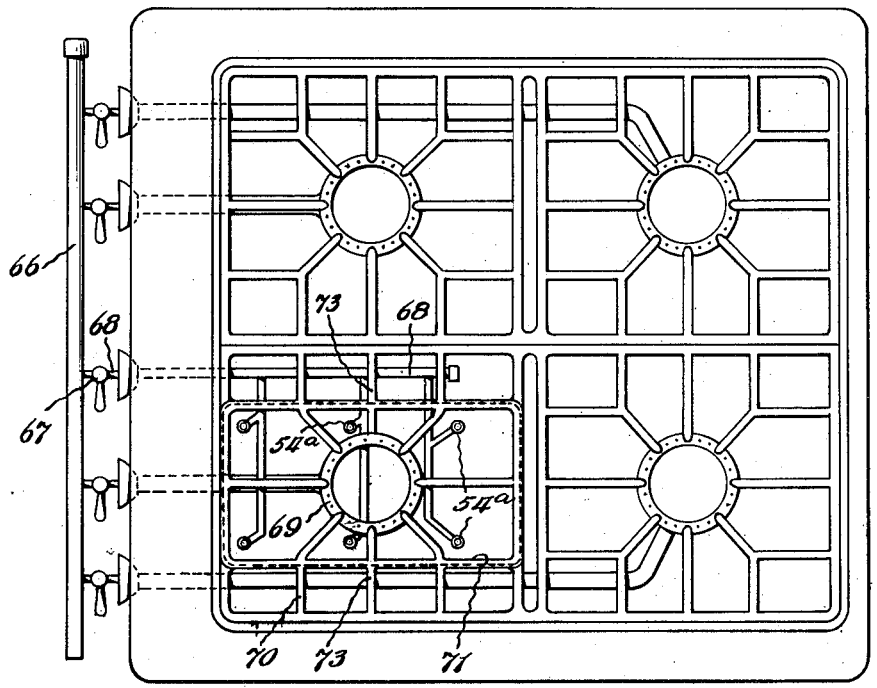
Fig. 4 is a plan of an ordinary gas stove modified to take the broiler shown in Fig. 3.

Fig. 4 shows how a conventional gas stove may be readily modified to take the broiler illustrated in Fig. 3, by equipping it with burner tubes 54a, spaced to take the mantle sleeves 53, held in the frame 60, and by adding to the regular stove manifold 66, an extra valve 67, and supply connections 68, carrying the six burner tubes.

As appears in Fig. 4, the burner tubes 54a, may be located so as not to interfere with the regular burner ring 69, and the grid 70, forming this part of the stove top may be modified by the provision of a rectangular frame 71, to locate and support the base portion of the broiler. The supporting frame 71, may have an upstanding flange or otherwise be constructed to interlock with the base portion of the broiler to prevent any lateral shifting of the broiler on the stove top, though this may not be considered necessary because of the engagement of the mantle support sleeves 53, down over the burner tubes 54a.

Pivoted hooks or other such means as indicated at 72, Fig. 3, may be provided on the broiler for securing the same in firmly held but removable relation on the stove. These hooks or retainers may be located to engage down under certain of the bars 73, of the stove top.

The casing of the broiler is shown as having long vents 74, in the upper side portions of the same and as having an opening 75, in the top for lighting the mantles.

The removable type of broiler illustrated, provides for quick conversion of an ordinary gas stove to the advantages of the present invention. With certain modifications in the stove structure, the broiler may be built in as a permanent part of the stove.

Also it is contemplated that the various features of the invention may be applied to heating and cooking on the stove top, in place of the ordinary ring burners, or to the operation of gas refrigerators or the heating of water in a tank or the like, as by the use of a mantle or mantles backed up by a parabolic or other heat reflector and preferably with the same low heat content features disclosed, that is, without surrounding insulation and heat absorbing walls and the like.

In all forms of the invention, maximum heat is available substantially instantaneously. There is practically no waiting or warming up time and since there is substantially no heat absorption, no thermostatic or other controls are required to build up the heat to a predetermined extent and to then cut it off or trim it down to avoid overheating, as in former practices employing insulation and involving features of high heat content.

In Fig. 12, comparative curves are illustrated showing at 76, how only 30 seconds was required to bring the toaster from cold or room temperature conditions up to the proper toasting zone temperature, that toast was then produced at 77, in 25 seconds additional time and that proper toasting temperature was maintained substantially uniformly at 78, without any heat controls; as against a warming up period at 79, of from 10 to 15 minutes required by an approved commercial form of gas toaster, plus a toasting time at 80, of 70 seconds, with fluctuating thermostat temperature control at 81.

Figs. 13 and 14 illustrate comparable results as between a toaster of the present invention and a conventional restaurant toaster when they are kept lighted, or "on order."

In Fig. 13, with the mantles at minimum flame, about 3 c. f. h. at 82, only 20 seconds was required to bring the toaster up to proper toasting zone temperature, which with a toasting time of 25 seconds made a total of only 45 seconds. This minimum flame standby operation makes ignition of the mantle unnecessary each time the gas is turned on and may be considered as a better substitute for the pilot form of operation.

In Fig. 14, with the conventional gas toaster, the minimum flame standby condition indicated at 83, required approximately 11 c. f. h. and the warming up period at 84, required 1 minute and 20 seconds, which with the 70 seconds toasting time required at 80, made a total of 2½ minutes.

These representative curves indicate savings in time and gas consumption attained by this invention over present approved forms of gas toasting equipment.

By adjusting the control valve, different degrees of heat are attainable and hence the extent of toasting can be readily regulated as desired. Because of the low heat content characteristics, the temperature to which the device is set will remain substantially constant, without automatic or any further control.

In both the toaster and the broiler, the circulation is from the bottom upward into a space above the mantles and beneath the top of the enclosing casing. This promotes combustion of smoke particles, rendering the device practically smokeless in operation. The flue outlets 74, in opposite sides of the broiler are about opposite the extended top portions of the mantles, above the reflector shields, so that any smoke has to pass through this intense heat zone.

The means for supporting the food or other material within the cooking zone and for introducing it and removing it from that region may vary within wide limits. For instance, meat, fish and such materials may be handled by clamping it within a wire grille and then introducing the grille directly or placing it within the slide operating in the broiling chamber.

The heat reflectors may be of light thin sheet metal, polished, plated, or otherwise surfaced to provide the best reflection and radiation of heat waves generated by the mantles.

While for general purposes it may be considered best to support the material vertically and radiate heat simultaneously to both sides of the same, it is contemplated that in some instances, the material may be supported horizontally in a pan or on a grid and have the heat projected downwardly thereon by mantles of the inverted type.

The toaster may be employed for broiling purposes and similarly the broiler may be used for toasting. In both, the optimum temperature is substantially invariable, so the product is more uniform and generally of better quality than produced by other methods. Because of the instantly available heat, the toaster, by way of example, can be changed without any waiting or lag, from one condition, as for toasting a rye bread, to a quite different condition as for toasting a heavier, whole wheat bread.

The control valve may pass a minimum gas flow, in the "low" position, Fig. 1, for example, about 3 c. f. h., to keep the mantles ready for instant use in any one of the five or other positions of the control valve. This method may be preferred to the use of the constant burning pilot. It will be appreciated too that any suitable "timer" may be applied for turning down the control valve or for actuating the shut off valve at the end of a predetermined period.

With the broiler used on top of the stove as in Figs. 3 and 4, a drip pan may be provided beneath the grid of the stove top, more or less conforming to the outlines of the broiler.

The invention utilizes to the best advantage, the short heat wave lengths, which are known to penetrate further into meat, for example, than the longer wave lengths. This is in accordance with Wien's displacement law, where for a rise in temperature for a given substance, the radiation curve of the substance is displaced to the left, so that the maximum point in the curve will correspond to a shorter wave length, such radiation curve being plotted with energy of radiation as the ordinate and wave length as the abscissa. While the type of oxide used will have an effect on the wave length, cerium oxide has been the principal oxide used for the purposes of the present invention and this has given excellent results, making possible, by way of example, the broiling of a 1 inch thick loin lamb chop 3½ minutes from a cold start.

Radiation efficiencies of 38% have been reported for Welsbach mantles designed for lighting purposes and radiating efficiencies in excess of this have been attained with mantles designed for heat producing purposes and employing predominantly cerium oxide, as opposed to the thorium oxide constituting 99% of the conventional Welsbach lighting mantles.

Tests have shown that some oxides subjected to the Welsbach mantle type of combustion will closely approximate flame temperature, a thorium oxide mantle having been reported to have reached a temperature of 3400° F. The flame temperature is only about 200° F. higher. The temperature and radiant heat efficiency of a preponderantly cerium oxide mantle is greater and in fact, greater so far as known, than has been attained heretofore in other known forms of broilers and toasters. The catalytic action in this type of surface combustion further contributes to the efficiency of this new form of cooker.

What is claimed is:

A quick acting radiant heat gas toaster or broiler comprising two sets of gas burners arranged in substantially parallel rows, spaced apart to provide a longitudinally extended radiant heat cooking zone therebetween, incandescent gas mantles mounted on said burners, low heat content light sheet metal radiant heat reflectors extending along the outer sides of said rows of incandenscent mantles and similar low heat content light sheet metal radiant heat reflectors extending across the ends of the rows and forming with said first reflectors, a heat radiating and reflecting enclosure about and in back of the mantles for concentrating the radiant heat energy of the mantles on said longitudinally extended cooking zone, said end reflectors having passages therethrough in line with said cooking zone, and a horizontally extending food conveyer operating in line with said longitudinally extended radiant heat cooking zone and said passages in the end reflectors, and means for providing a chimney effect circulation upwardly through said heat radiating and reflecting enclosure, said means including an enclosure about said reflectors, said enclosure having openings in line with the side reflectors and said side reflectors being bodily removable through said openings for purposes of cleaning or the like.

HARRY B. WILSON.

REFERENCES CITED

The following references are of record in the file of this patent:

UNITED STATES PATENTS

| Number | Name | Date |
|---|---|---|
| 462,921 | Gibbons | Nov. 10, 1891 |
| 521,718 | Koll | June 19, 1894 |
| 708,383 | Murray et al. | Sept. 2, 1902 |
| 784,612 | Allyn | Mar. 14, 1905 |
| 1,369,758 | Chippindale | Feb. 22, 1921 |
| 1,473,213 | De Matteis | Nov. 6, 1923 |
| 1,587,023 | Mottlau | June 1, 1926 |
| 1,667,988 | Richardson | May 1, 1928 |
| 1,993,607 | Kalgren | Mar. 5, 1935 |
| 2,027,930 | Padelford | Jan. 14, 1936 |
| 2,031,330 | Padelford et al. | Feb. 18, 1936 |

FOREIGN PATENTS

| Number | Country | Date |
|---|---|---|
| 605,529 | France | Feb. 19, 1926 |